US009175758B2

(12) United States Patent
Dutson et al.

(10) Patent No.: US 9,175,758 B2
(45) Date of Patent: Nov. 3, 2015

(54) TRANSMISSION OF THE TOROIDAL RACE ROLLING TRACTION TYPE

(75) Inventors: Brian Joseph Dutson, Manchester (GB); Leslie Kendrick Robinson, Preston (GB)

(73) Assignee: TOROTRAK (DEVELOPMENT) LIMITED, Lancashire (GB)

( * ) Notice: Subject to any disclaimer, the term of this patent is extended or adjusted under 35 U.S.C. 154(b) by 999 days.

(21) Appl. No.: 10/552,679

(22) PCT Filed: Apr. 8, 2004

(86) PCT No.: PCT/GB2004/001556
§ 371 (c)(1),
(2), (4) Date: Sep. 18, 2006

(87) PCT Pub. No.: WO2004/090382
PCT Pub. Date: Oct. 21, 2004

(65) Prior Publication Data
US 2007/0149347 A1    Jun. 28, 2007

(30) Foreign Application Priority Data

Apr. 9, 2003  (GB) .................................. 0308214.6

(51) Int. Cl.
*F16H 15/38*    (2006.01)
(52) U.S. Cl.
CPC ..................... *F16H 15/38* (2013.01)
(58) Field of Classification Search
CPC ..................................................... F16H 15/38
USPC ........................................ 476/10, 40, 42, 46
See application file for complete search history.

(56) References Cited

U.S. PATENT DOCUMENTS

| 3,810,398 A | 5/1974 | Kraus |
| 5,044,214 A | 9/1991 | Barber, Jr. |
| 5,395,292 A | 3/1995 | Fellows et al. |
| 5,971,886 A * | 10/1999 | Yamamoto ..................... 476/10 |

FOREIGN PATENT DOCUMENTS

| DE | 102 23 425 A | 12/2003 |
| EP | 0333630 A2 | 9/1989 |
| EP | 1350987 B1 | 10/2003 |
| GB | 665237 | 1/1952 |
| JP | 0374667 | 3/1991 |
| JP | 7091513 A | 4/1995 |
| JP | 7-280055 | * 10/1995 |
| JP | 8135746 A | 5/1996 |
| JP | 2002013605 A | 7/2003 |

(Continued)

OTHER PUBLICATIONS

PCT International Search Report, International application No. PCT/GB2004/001556, Int'l filing date: Apr. 8, 2004, Applicant: Torotrak (Development) Ltd., 4 pages.

(Continued)

*Primary Examiner* — William C Joyce
(74) *Attorney, Agent, or Firm* — Brooks Kushman P.C.

(57) ABSTRACT

A transmission of the toroidal race rolling traction type, including ratio varying components ("variators") for such transmissions. A set of rollers transmitting traction between an input disc and an output disc is connected to a hydraulic mechanism by which it is positioned, the roller position determining the transmitted ratio.

33 Claims, 9 Drawing Sheets

(56) References Cited

FOREIGN PATENT DOCUMENTS

| | | |
|---|---|---|
| SU | 579482 | 11/1977 |
| WO | WO 02/48578 A | 6/2002 |
| WO | 2004027293 A1 | 4/2004 |
| WO | WO 2004/027293 A1 | 4/2004 |
| WO | 2004090382 A1 | 10/2004 |

OTHER PUBLICATIONS

Search Report Under Section 17(5); corresponding European application No. GB 0308214.6; date of search Oct. 15, 2003.

* cited by examiner

TRANSMISSION OF THE TOROIDAL RACE ROLLING TRACTION TYPE

BACKGROUND OF THE INVENTION

1. Field of the Invention

The present invention relates to transmissions of the toroidal race rolling traction type. It relates in particular to ratio varying components ("variators") for such transmissions, in which each of a set of rollers transmitting traction between an input disc and an output disc is connected to a hydraulic mechanism by which it is positioned, the roller position being a key factor in determining the transmitted ratio.

2. Background Art

Variators of this type are well known in the art, for example from GB-C-1395391, GB-A-2107009, EP-A-0078125 and EP-A-0133330. In common with most prior art variators, these specifications show a set of three rollers transmitting traction between a rotatable input disc and a coaxial and contra rotating output disc, each roller being spaced from the others by 120° of arc around the common axis of the discs. The ratio transmitted from the input to the output disc by each roller is caused to vary by changing the position of that roller in a direction substantially tangential relative to the centre circle of the common torus presented by the input and output disc races. The mechanism for imparting that tangential movement to at least some of the rollers comprises pistons formed at opposite ends of the roller carriage, that is to say the structure carrying the bearings on which the roller rotates, and movable within hydraulic cylinders.

In the prior art arrangements, the piston and cylinder assemblies for controlling the rollers necessarily project from the casings of the variator. Whilst this does not cause a problem from an operational point of view, it can be detrimental if the available space for installing the variator is limited.

EP-A-0538357 addresses this problem by positioning the cylinders to lie to the same side of a common plane including the axis of the discs. This improves the situation considerably but still results in lateral projections for the piston/cylinder arrangements.

SUMMARY OF THE INVENTION

In accordance with a first aspect of the present invention, there is provided a variator of the toroidal-race rolling-traction type comprising:
a rotatably mounted input disc;
an output disc rotatably mounted coaxially with the input disc;
a plurality of rollers transmitting rotation between the input disc and the output disc;
a plurality of actuators, each acting upon a respective one of the rollers; and
a plurality of levers, each connected to a respective one of the rollers and its associated actuator.

By connecting each of the rollers to its associated actuator by means of a lever, there is much more freedom of choice for positioning the actuators, which allows a more compact design of variator to be achieved.

Preferably, each roller and its associated actuator is connected to a respective lever. The variator preferably comprises a plurality of levers pivotally mounted about a first axis. The variator may also comprise a lever pivotally mounted about a second axis. The second axis may be inclined to the first axis.

Preferably, each of the actuators is mounted to the same side of a plane aligned with and passing through the rotational axis of the variator discs. More preferably, each of the actuators is mounted below a horizontal plane aligned with and passing through the rotational axis of the variator discs.

In a preferred embodiment, each of the actuators is located radially outwardly of a common plane extending parallel to the rotational axis of the input and output discs and tangential to the periphery of the larger of the input disc and output disc.

In this way, the actuators can all be arranged adjacent to each other "on one side" of the variator which again allows a more compact design of variator.

Preferably, the common plane extends substantially horizontally. In this way, all of the actuators can be located beneath the variator discs.

Preferably, the common plane is tangential to the lowermost point of the larger of the input and output disc.

Preferably, the directions of displacement of the actuators are substantially parallel and preferably the directions of displacement of the actuators are perpendicular to the common plane.

In a preferred embodiment, each actuator comprises a piston reciprocably disposed within a cylinder.

Preferably, the longitudinal axes of the cylinders are substantially parallel.

Preferably, the pistons are displaceable by means of hydraulic pressure and advantageously the cylinders are disposed in a common cylinder block.

Preferably the actuators are double-acting, i.e. operable to displace the roller in each of two opposite directions.

In accordance with a second aspect of the present invention there is a provided a variator of the toroidal-race rolling-traction type comprising:
a rotatably mounted input disc;
an output disc rotatably mounted coaxially with the input disc;
a plurality of rollers transmitting rotation between the input disc and the output disc; and
a plurality of actuators, each acting upon a respective one of the rollers;
wherein each of the actuators is located radially outwardly of a common plane extending parallel to the rotational axis of the input and output discs and tangential to the periphery of the larger of the input disc and output disc.

By locating all of the actuators as described above, it is possible to achieve a much more compact arrangement and to utilise the available space more efficiently.

Preferably, the common plane extends substantially horizontally. More preferably, the common plane is tangential to the lowermost point of the larger of the input disc and output disc.

In this way, all of the actuators can be located beneath the variator discs.

Preferably, the directions of displacement of the actuators are parallel. For example, the directions of displacement of the actuators may be perpendicular to the common plane.

Each actuator may comprise a piston reciprocably disposed within a cylinder. The pistons are preferably displaceable by hydraulic pressure.

The longitudinal axes of the cylinders are preferably substantially parallel. The cylinders may be disposed in a common cylinder block.

Preferably, the actuators are double-acting.

The variator may further comprise a plurality of levers, each connected to a respective one of the rollers and its associated actuator.

Preferably, each roller and its associated actuator is connected to a respective lever.

The variator preferably comprises a plurality of levers pivotally mounted about a first axis. The variator may also comprise a lever pivotally mounted about a second axis. The second axis may be inclined to the first axis.

By way of example only, a specific embodiment of the present invention will now be described, with reference to the accompanying drawings, in which.

BRIEF DESCRIPTION OF THE DRAWINGS

DETAILED DESCRIPTION OF THE PREFERRED EMBODIMENTS

The attached figures illustrate an infinitely variable transmission (IVT) assembly 10 having an outer upper casing 12 which is mounted on a lower cylinder block 14. The casing 12 houses an IVT of the toroidal race rolling traction type having a pair of front and rear input discs 18, 20 and a common output disc 22, all mounted on a common rotational axis.

The input discs are rotated by an input shaft (not shown) connected to the output of an engine. Drive from the output shaft is transmitted to the two input discs 18, 20 by means of splined connections 24. The input shaft also passes through a bearing (not shown) mounted at the centre of the output disc 22.

The opposing faces of the input discs and output discs are provided with toroidal surfaces which define front and rear toroidal cavities 26, 28. Drive is transmitted from the input discs to the output discs by means of two sets of three roller assemblies 30a, 30b, 30c, 32a, 32b, 32c, one set 30, 32 of roller assemblies positioned in each of the two toroidal cavities 26, 28 and the roller assemblies of each set being spaced apart by approximately 120°. Each roller assembly comprises a disc-like roller 33 rotatably mounted in a roller carriage 34 by means of a stub axle 35.

A high end load is applied hydraulically to one of the input discs (usually the rear disc) which is internally reacted to by tension in the input shaft, thereby clamping the rollers 33 between the discs 18, 22 and 20, 22. At the contact between the discs and rollers power is transmitted by a shearing action through a traction fluid. When the contact points are subjected to very high pressures by the end load, the traction fluid greatly increases in viscosity at the contact points and the elasto-hydrodynamic characteristics of the fluid allow driving traction force to be transmitted effectively.

In order for power to be transmitted between the discs and rollers a reaction force needs to be provided. Reaction forces are applied hydraulically to the individual rollers, as will be explained, to ensure that reaction torque is shared equally between the rollers and to provide a very direct means of controlling transmitted torque.

Output from the variator is taken from the output disc 22. In the specific embodiment described, the variator 10 is a coaxial variator, i.e. the output from the output disc is taken from a hollow shaft (not shown) connected to the output disc and arranged coaxially with the input shaft and is passed to a gear set together with a drive from the input shaft. In an alternative construction, the output from the variator may be taken from the periphery of the output disc 22 by means of a chain or belt passing around the output disc.

The features described above are generally conventional for an IVT of the toroidal race rolling traction type.

Reaction torque is applied to the roller 33 of each roller assembly by a respective one of six double-acting reaction pistons 36a, 36b, 36c, 38a, 38b, 38c, each of which is slidably disposed in a respective one of six cylinders 40a, 40b, 40c, 42a, 44b, 44c provided in the cylinder block 14. The longitudinal axes of the cylinders 40, 42, and therefore the axis of movement of the pistons 36, 38 are parallel to each other and, in the embodiment described, are all arranged vertically. However, each piston 36, 38 does not act directly on its associated roller assembly but instead acts on a lever 44, 46 to which the roller assembly is attached.

As shown in the figures, the levers in each cavity are not identical. This allows more efficient use of the available space and therefore provides a more compact assembly. Referring firstly to the front toroidal cavity 26 between the front input disc 18 and the output disc 22 and looking from the front of the assembly, a first roller assembly 30a is attached via a universal joint (e.g. a "Rose" bearing) 47 to one end of a second order lever 44a, the fulcrum of the lever being provided by a first fulcrum bar 48 to which the lever is pivotally mounted by means of a bearing 50a and the rod 52a extending from reaction piston 36a being pivotally connected to the lever 44a between the two ends of the lever. The fulcrum bar itself is mounted between front and rear bearing lugs 54 on a fulcrum plate 56 positioned on top of the upper surface of the cylinder block 14a.

A second roller assembly 30b is attached, also via a universal joint (e.g. a "Rose" bearing) 47, to one end of a first order lever 44b, the fulcrum being provided by the fulcrum bar 48 described previously on which the lever 44b is mounted by means of a bearing 50b. The rod 52b extending from the reaction piston 36b is pivotally mounted to the opposite end of the lever 44b.

The third roller assembly 30c of the front toroidal cavity 26 is attached via a universal joint (e.g. a "Rose" bearing) 47 and a connecting arm 45 to a third order lever 44c, the connecting arm extending from a point between the fulcrum of the lever and the pivotal connection of the lever with a rod 52c projecting from the reaction piston 36c. The fulcrum is provided by a second fulcrum bar 60 extending between two mounting lugs 62 on the upper surface of the fulcrum plate 56 to which the lever is pivotally mounted by means of a bearing 50c. The longitudinal axis of the second fulcrum bar 60 extends in a plane parallel to that of the first fulcrum bar 48 but displaced downwardly therefrom and inclined towards it.

In each case, the universal joint 47 is connected to the roller carriage 34 of the roller assembly.

The rear chamber 28 is also provided with first, second and third roller assemblies 32a, 32b, 32c attached to levers 46a, 46b, 46c. Roller assemblies 32a and 32b and levers 46a and 46b are virtually identical to the roller assemblies 30a and 30b and levers 44a and 44b of the front cavity 26 with only detail differences. Roller assembly 32c and lever 46c are identical to roller assembly 30c and lever 46c of the front cavity. Levers 44a and 44b are pivotally mounted on the first fulcrum bar 48 via bearings 50. The lever 46c is pivotally mounted via a bearing 50c on a third fulcrum bar 68 which corresponds to the second fulcrum bar 60 of the front chamber 26. In fact, the positions and orientations of the rollers and levers in the front and rear chambers 26, 28 are virtually a mirror image of each other about a plane passing through the centre of the output disc 22 perpendicularly to the rotational axis of the input and output discs 18, 20, 22 with only detailed differences in the shapes of the levers in the two cavities.

Figure 1:
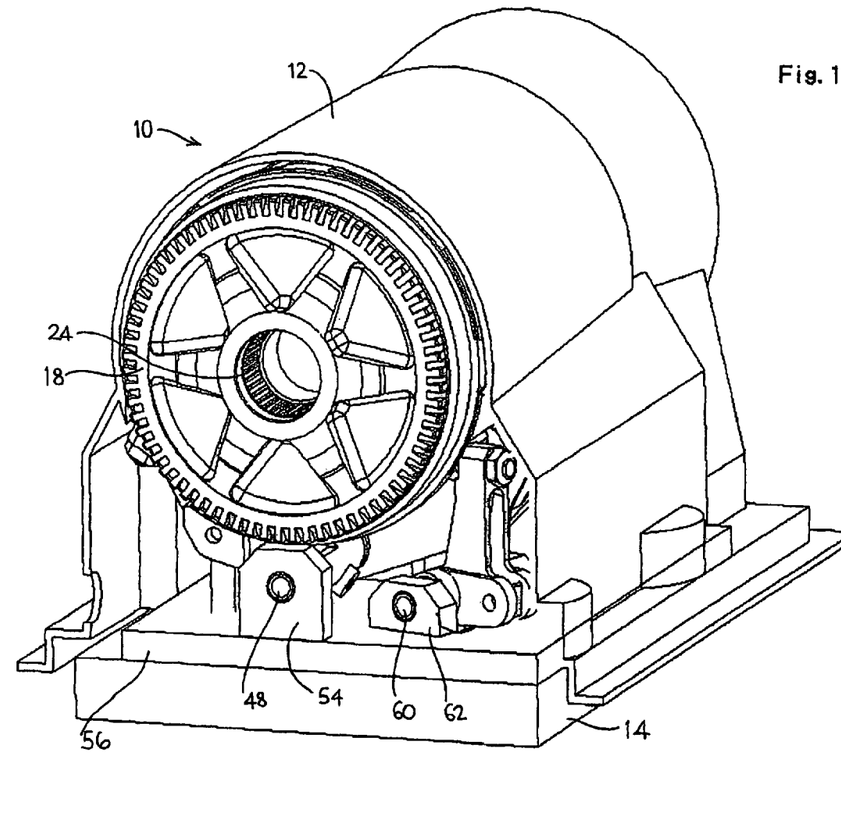
FIG. 1 is a perspective view of an embodiment of infinitely variable transmission (IVT) in accordance with the present invention.
Figure 2:
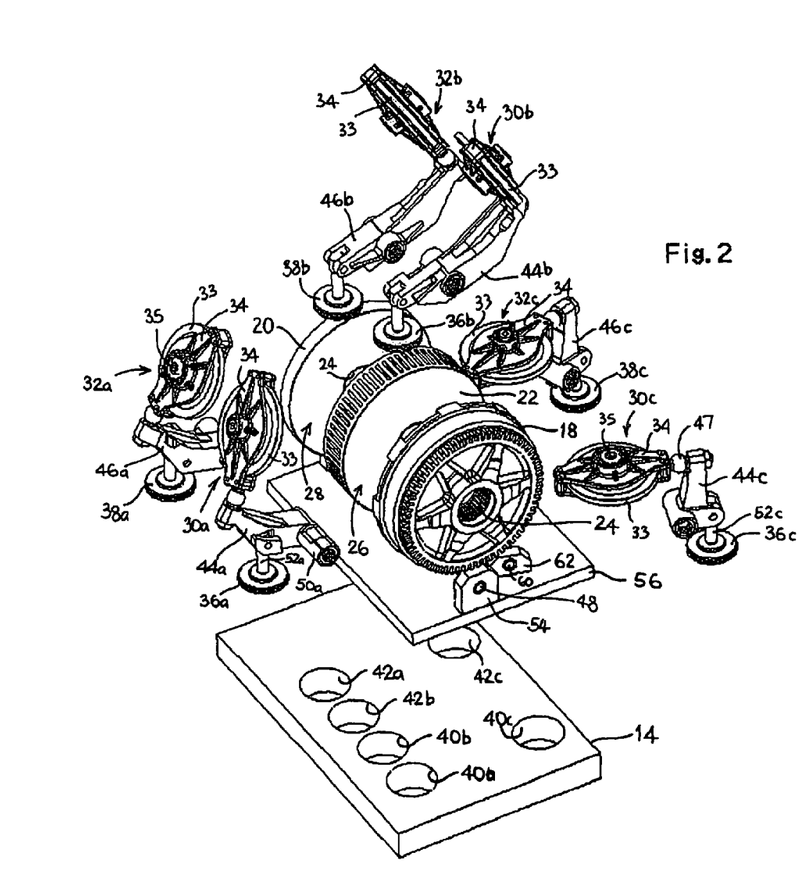
FIG. 2 is an exploded perspective view of the IVT of FIG. 1, with the outer casing removed.
Figure 3:
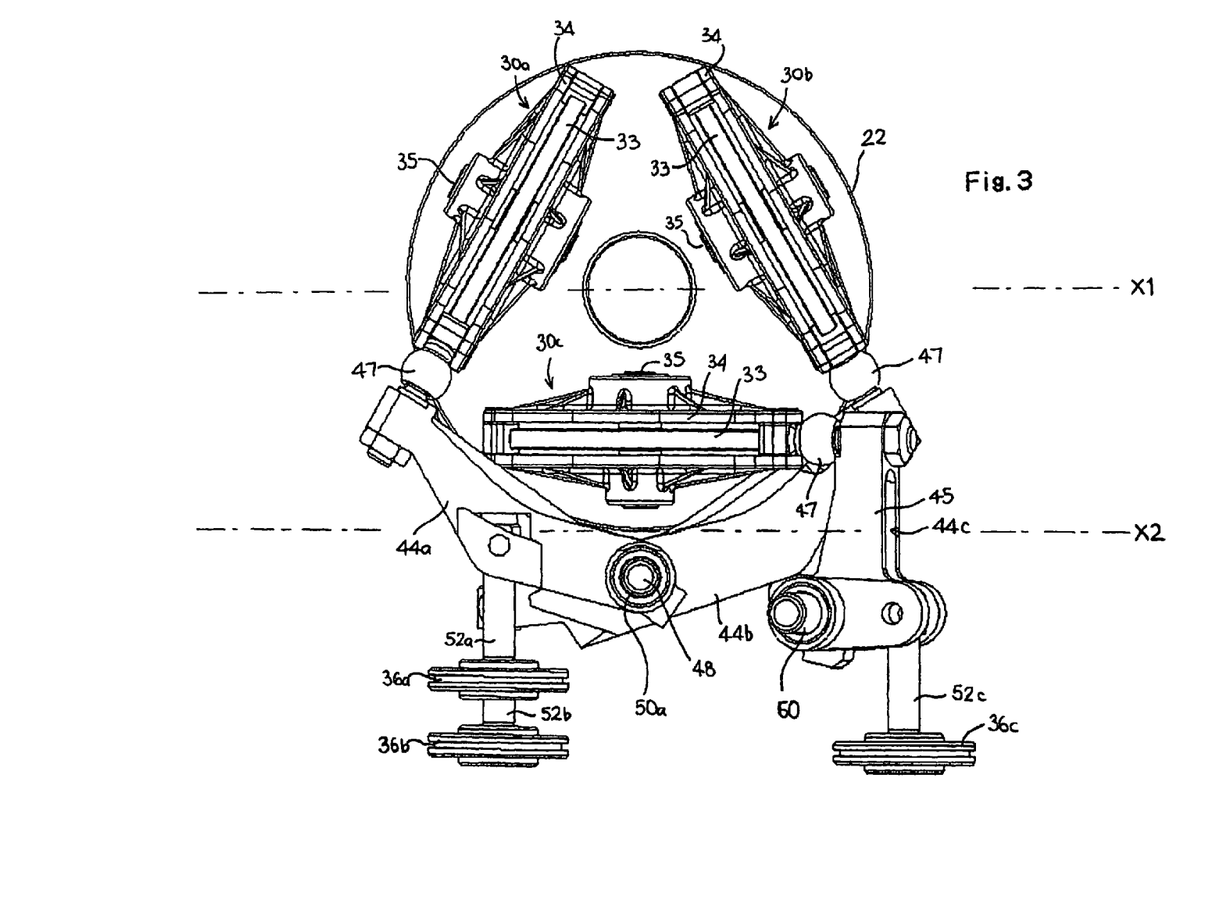
FIG. 3 is a front view of the IVT of FIG. 1, with the upper casing and front disk removed.
Figure 4:
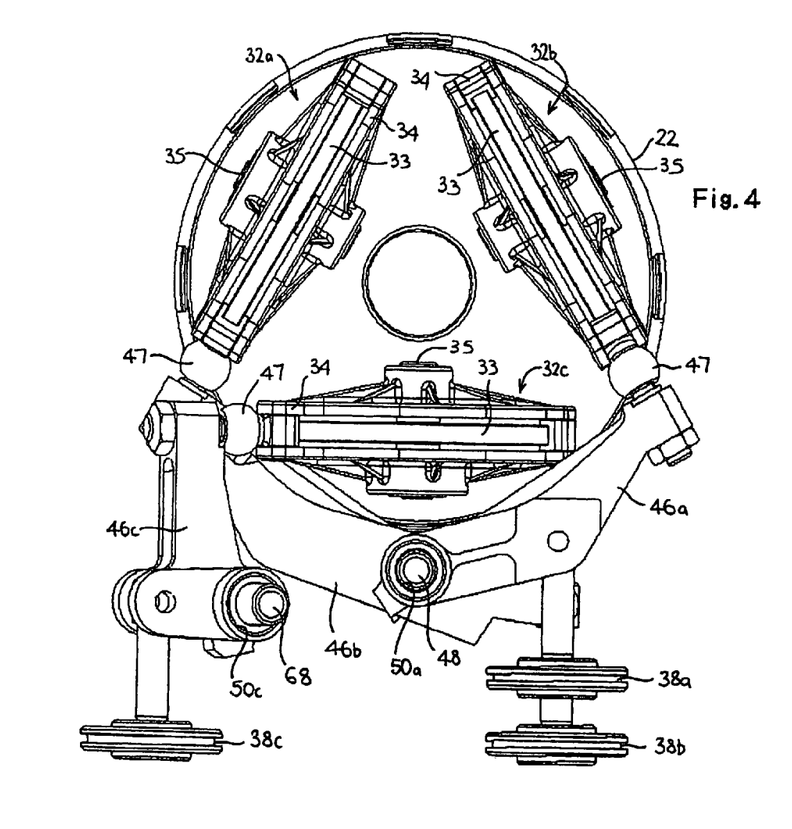
FIG. 4 is a rear view of the IVT of FIG. 1, with the casing and rear disc removed.
Figure 5:
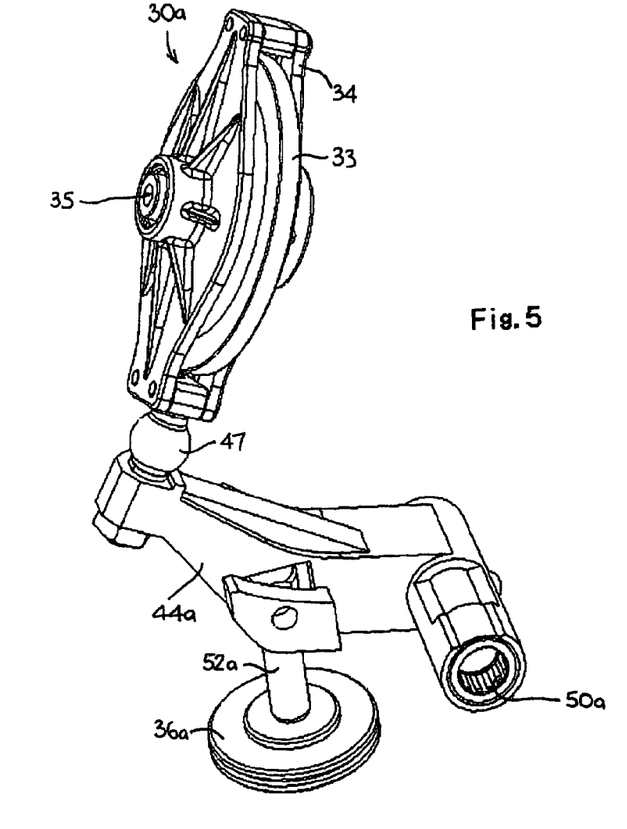
FIGS. 5 to 9 are perspective views of lever/roller assemblies of the IVT of FIG. 1.
Figure 6:
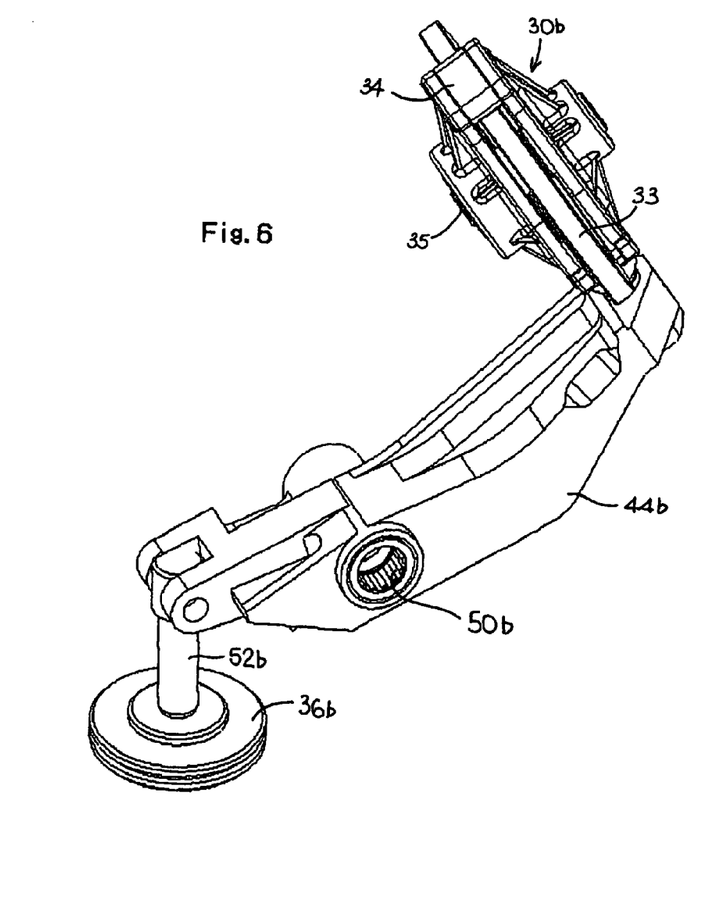
Figure 7:
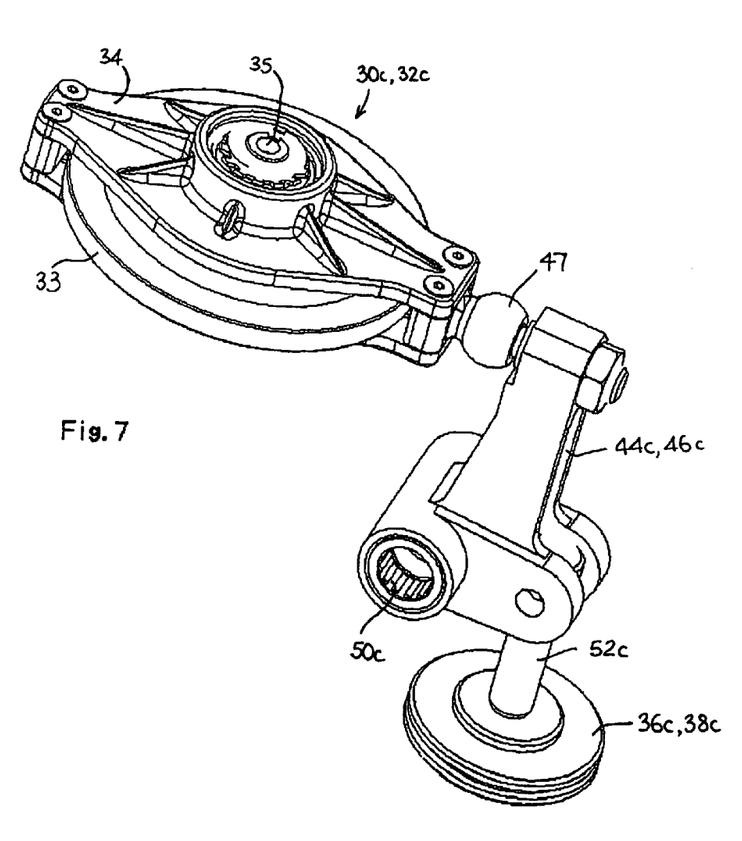
Figure 8:
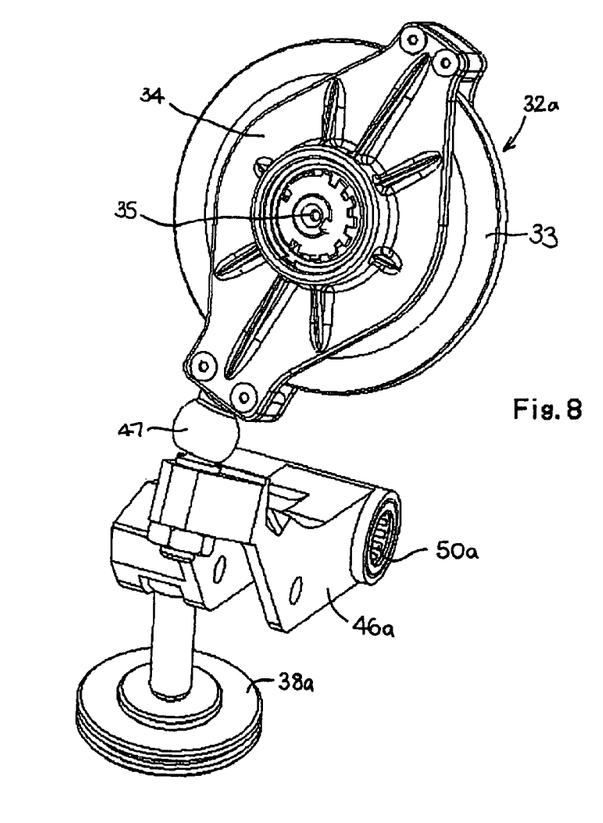
Figure 9:
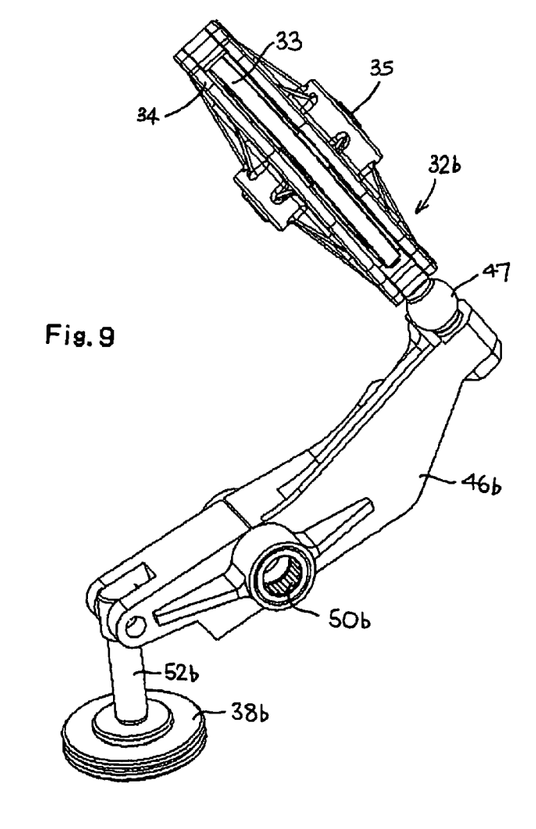

As can be seen from the Figures, particularly FIGS. 3 and 4, the actuating pistons are all located entirely radially outwardly of the input and output discs 18, 20, 22 of the variator. It will be seen that all of the actuating pistons are located to the same side of a plane X1 passing horizontally through the rotational axis of the variator discs. Indeed, the actuating pistons are all located outwardly (with respect to the variator axis) of a single common plane X2 extending parallel to the rotational axis of the variator discs and tangential to the periphery of the largest of the discs (in this embodiment the diameters of the two input discs 18, 20 and of the output disc 22 are equal) and, in this embodiment, extending horizontally.

By connecting each actuating piston to its associated roller assembly via a lever and by positioning all of the actuators beyond plane X2, it is possible to chose the position of the actuating pistons with much more freedom. As a result, a much more compact arrangement can be achieved.

In effect, the actuating pistons are all located "on the same side" of the variator which allows a much more compact arrangement to be made.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A variator comprising:
a rotatably mounted input disc;
an output disc rotatably mounted coaxially with the input disc;
a plurality of rollers transmitting rotation between the input disc and the output disc;
a plurality of roller carriages, each roller being rotatably mounted on one of the roller carriages, and each roller carriage being supported only by a single pivoting joint whereby each roller carriage is capable of three degrees of rotational movement about the single pivoting joint;
a plurality of levers, each connected to the single pivoting joint of a corresponding roller carriage; and
a plurality of actuators, each connected to a corresponding lever for applying a reaction force to the corresponding roller carriages via the single pivoting joint, each of the plurality of actuators being mounted on the same side of a plane aligned with and passing through a rotational axis of the input and output discs.

2. A variator as claimed in claim 1, wherein each roller and its associated actuator is connected to a respective lever.

3. A variator as claimed in claim 1, comprising a plurality of levers pivotally mounted about a first axis.

4. A variator as claimed in claim 3, comprising a lever pivotally mounted about a second axis.

5. A variator as claimed in claim 1, wherein the plurality of actuators lie on one side of a plane including a variator axis.

6. A variator as claimed in claim 5, wherein each of the actuators is mounted below a horizontal plane aligned with and passing through the rotational axis of the discs.

7. A variator as claimed in claim 1, wherein the input and output discs are of different sizes and wherein each of the plurality of actuators is located radially outwardly of a common plane extending parallel to the rotational axis of the input and output discs and tangential to the periphery of the larger of the input disc and output disc.

8. A variator as claimed in claim 7, wherein the common plane extends substantially horizontally.

9. A variator as claimed in claim 8, wherein the common plane is tangential to the lowermost point of the larger of the input disc and the output disc.

10. A variator as claimed in claim 7, wherein the directions of displacement of the plurality of actuators are substantially parallel.

11. A variator as claimed in claim 10, wherein the directions of displacement of the plurality of actuators are perpendicular to the common plane.

12. A variator as claimed in claim 1, wherein each of the plurality of actuators comprises a piston reciprocably disposed within a cylinder.

13. A variator as claimed in claim 12, wherein the longitudinal axes of the cylinders are substantially parallel.

14. A variator as claimed in claim 12, wherein the pistons are displaceable by means of hydraulic pressure.

15. A variator as claimed in claim 12, wherein the cylinders are disposed in a common cylinder block.

16. A variator as claimed in claim 12, wherein each actuator in the plurality of actuators is double-acting.

17. The variator of claim 1, features comprising traction fluid interposed between the discs and the rollers for transmitting drive hydraulically therebetween, so that the variator is a traction type of variator.

18. A variator comprising:
a rotatably mounted input disc;
an output disc rotatably mounted coaxially with the input disc;
a plurality of rollers for transmitting rotation between the input disc and the output disc;
a plurality of actuators, each acting upon a respective one of the rollers;
a plurality of levers, each connected to a respective one of the rollers and its associated actuator, the plurality of levers being pivotally mounted about a first axis; and
a lever pivotally mounted about a second axis wherein the second axis is inclined to the first axis.

19. A variator comprising:
a rotatably mounted input disc;
an output disc rotatably mounted coaxially with the input disc;
a plurality of rollers transmitting rotation between the input disc and the output disc;
a plurality of roller carriages, each roller being rotatably mounted on one of the roller carriages and each roller carriage being supported only by a single pivoting joint whereby each roller carriage is capable of three degrees of rotational movement about the single pivoting joint;
a plurality of actuators, each acting upon the single pivoting joint of the corresponding roller carriage, for applying a reaction force to the corresponding roller carriages;
wherein each of the actuators is located radially outwardly of a common plane extending parallel to the rotational axis of the input and output discs and tangential to the periphery of the larger of the input disc and output disc.

20. A variator as claimed in claim 19, wherein the common plane extends substantially horizontally.

21. A variator as claimed in claim 20, wherein the common plane is tangential to the lowermost point of the larger of the input disc and the output disc.

22. A variator as claimed in claim 19, wherein the directions of displacement of the plurality of actuators are parallel.

23. A variator as claimed in claim 19, wherein the directions of displacement of the plurality of actuators are parallel.

24. A variator as claimed in claim 19, wherein each actuator in the plurality of actuators comprises a piston reciprocably disposed within a cylinder.

25. A variator as claimed in claim 24, wherein the longitudinal axes of the cylinders are substantially parallel.

26. A variator as claimed in claim 24, wherein the pistons are displaceable by means of hydraulic pressure.

27. A variator as claimed in claim 24, wherein the cylinders are disposed in a common cylinder block.

28. A variator as claimed in claim 19, wherein each of the plurality of actuators is double-acting.

29. A variator as claimed in claim 19, further comprising a plurality of levers, each connected to a respective one of the plurality of rollers and its associated actuator.

30. A variator as claimed in claim 29, wherein each roller and its associated actuator is connected to a respective lever.

31. A variator as claimed in claim 29, comprising a plurality of levers pivotally mounted about a first axis.

32. A variator as claimed in claim 31, comprising a lever pivotally mounted about a second axis.

33. A variator comprising:
a rotatably mounted input disc;
an output disc rotatably mounted coaxially with the input disc;
a plurality of rollers for transmitting rotation between the input disc and the output disc;
a plurality of actuators, each acting upon a respective one of the rollers;
wherein each of the actuators is located radially outwardly of a common plane extending parallel to the rotational axis of the input and output discs and tangential to the periphery of the larger of the input disc and output disc;
a plurality of levers, each connected to a respective one of the plurality of rollers and its associated actuator;
a plurality of levers pivotally mounted about a first axis;
a lever pivotally mounted about a second axis, wherein the second axis is inclined to the first axis.

* * * * *